United States Patent
Liao et al.

(10) Patent No.: US 10,885,913 B2
(45) Date of Patent: Jan. 5, 2021

(54) OBJECT SEARCHING METHOD, OBJECT SEARCHING DEVICE AND OBJECT SEARCHING SYSTEM

(71) Applicants: Inventec Appliances (Pudong) Corporation, Shanghai (CN); Inventec Appliances Corp., New Taipei (TW); Inventec Appliances (Shanghai) Co., Ltd., Shanghai (CN)

(72) Inventors: Shyh-Shian Liao, New Taipei (TW); Yu-Chiang Tsao, New Taipei (TW)

(73) Assignees: Inventec Appliances (Pudong) Corporation, Shanghai (CN); Inventec Appliances Corp., New Taipei (TW); Inventec Appliances (Shanghai) Co., Ltd., Shanghai (CN)

( * ) Notice: Subject to any disclaimer, the term of this patent is extended or adjusted under 35 U.S.C. 154(b) by 117 days.

(21) Appl. No.: 16/211,212

(22) Filed: Dec. 5, 2018

(65) Prior Publication Data

US 2020/0005779 A1 Jan. 2, 2020

(30) Foreign Application Priority Data

Jun. 29, 2018 (CN) .......................... 2018 1 0697906

(51) Int. Cl.
*G10L 15/22* (2006.01)
*G10L 13/00* (2006.01)

(52) U.S. Cl.
CPC .............. *G10L 15/22* (2013.01); *G10L 13/00* (2013.01); *G10L 2015/223* (2013.01)

(58) Field of Classification Search
CPC ....................................................... G10L 15/22
USPC ........................................................... 704/251
See application file for complete search history.

(56) References Cited

U.S. PATENT DOCUMENTS

| 9,449,075 B2* | 9/2016 | Liao .................... G06F 16/3322 |
| 9,578,159 B2* | 2/2017 | Muthukumar ........ H04W 88/06 |
| 9,753,119 B1* | 9/2017 | Velusamy ............... G01S 17/86 |
| 9,916,538 B2* | 3/2018 | Zadeh ..................... G06N 7/005 |
| 10,354,407 B2* | 7/2019 | Lablans ................... G01C 3/06 |
| 2016/0165341 A1 | 6/2016 | Benattar |

FOREIGN PATENT DOCUMENTS

| CN | 101571406 A | 11/2009 |
| CN | 101029931 B | 5/2010 |
| CN | 101882351 A | 11/2010 |
| CN | 106658458 A | 5/2017 |
| WO | 2017128153 A1 | 8/2017 |

* cited by examiner

*Primary Examiner* — Susan I McFadden
(74) *Attorney, Agent, or Firm* — CKC & Partners Co., LLC

(57) ABSTRACT

An object searching method is disclosed. The object searching method includes the following operations: receiving an user message; analyzing an object name from the user message; obtaining a locator corresponding to the object name according to a locator mapping table; detecting a locator distance and a locator direction of the locator; generating a description string according to the locator distance, the locator direction, and a feature direction map; generating a voice message according to the description string and the object name; and broadcasting the voice message.

20 Claims, 7 Drawing Sheets

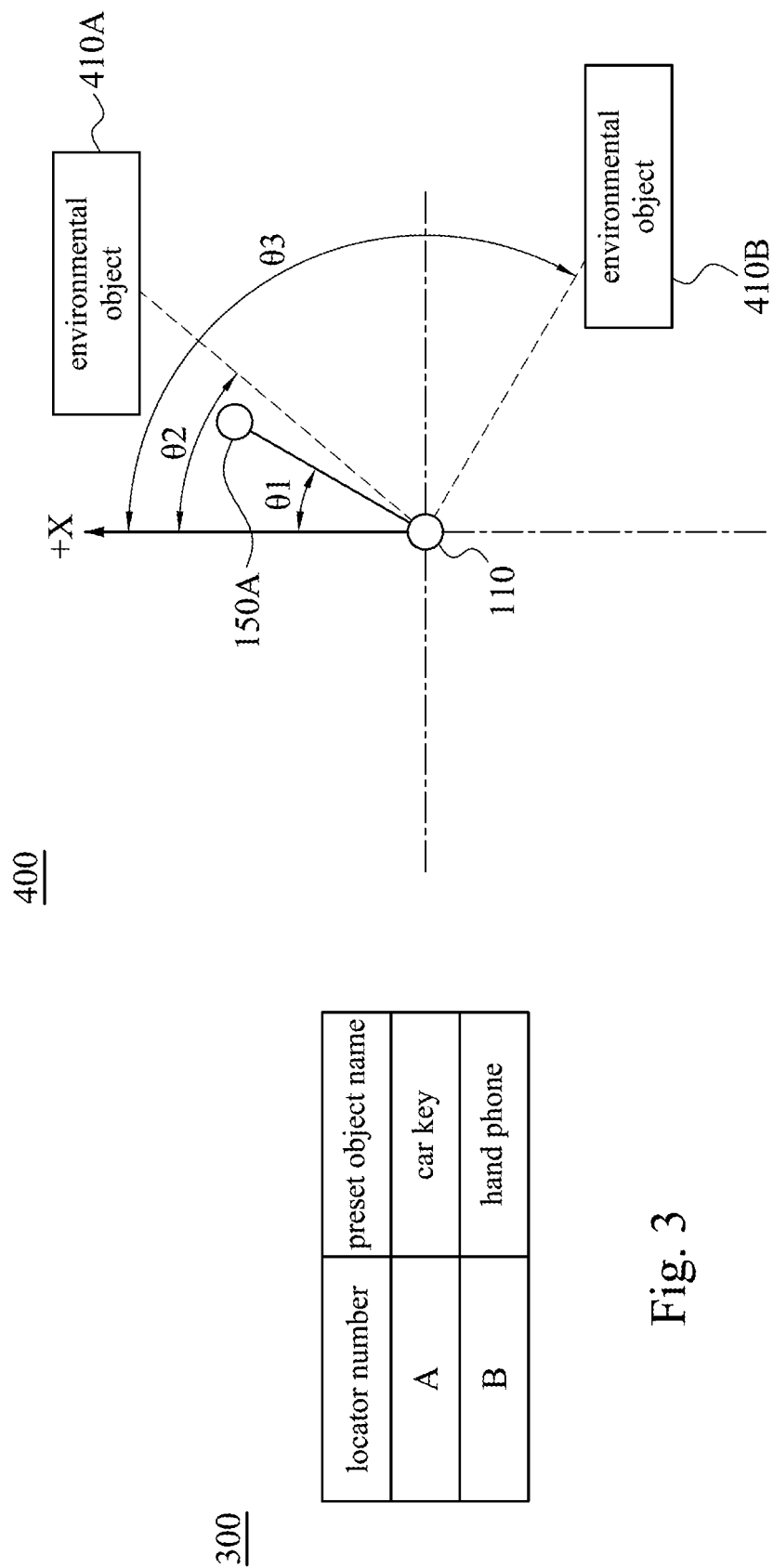

| environmental object | environmental object distance | environmental object pitch angle | environmental object horizontal angle |
|---|---|---|---|
| door | 15 centimeters | +15 degrees | +45 degrees |
| window | 30 centimeters | -45 degrees | +95 degrees |

OBJECT SEARCHING METHOD, OBJECT SEARCHING DEVICE AND OBJECT SEARCHING SYSTEM

CROSS-REFERENCE TO RELATED APPLICATION

This application claims priority to China Application Serial Number 201810697906.1, filed Jun. 29, 2018, which is herein incorporated by reference.

FIELD OF INVENTION

The invention relates to an object searching method, an object searching device, and an object searching system. More particularly, the invention relates to an object searching method, an object searching device, and an object searching system with voice interaction

BACKGROUND

Nowadays, people often have situations of being unable to find things like cellphones, keys, etc., and are as such unable to find items before going out, or discovering that items have been forgotten when they go out. Therefore, how to effectively help the users to find items such as hand phones, keys, etc. is one of the problems to be improved in the art.

SUMMARY

An embodiment of this disclosure is to provide an object searching method. The object searching method includes the following operations: receiving, by an object searching device, an user message; analyzing, by the object searching device, an object name from the user message; obtaining, by the object searching device, a locator corresponding to the object name according to a locator mapping table; detecting, by the object searching device, a locator distance and a locator direction of the locator; generating, by the object searching device, a description string according to the locator distance, the locator direction, and a feature direction map; generating, by the object searching device, a voice message according to the description string and the object name; and broadcasting, by the object searching device, the voice message.

An embodiment of this disclosure is to provide an object searching device. The object searching device includes an output/input element, a memory, and a processor. The output/input element is configured to receive a user message. The memory is configured to store a locator mapping table and a feature direction map. The processor is configured to analyze an object name from the user message, and to obtain a locator corresponding to the object name according to the locator mapping table. The detection element is configured to detect a locator distance and a locator direction of the locator. The processor is further configured to generate a description string according to the locator distance, the locator direction, and the feature direction map, and generate a voice message according to the description string and the object name. The output/input element broadcasts the voice message.

An embodiment of this disclosure is to provide an object searching system. The object searching system includes a first object searching device and a second object searching device. The first object searching device, located at a first space, is configured to receive a user message, analyze an object name from the user message, obtain a locator corresponding to the object name according to a locator mapping table, and detect the locator, when the first object searching device is unable to detect the locator, the first object searching device transmits a searching instruction. The second object searching device, located at a second space, is communicatively connected to the first object searching device, configured to detect a locator distance and a locator direction of the locator according to the searching instruction, generate a description string according to the locator distance, the locator direction, and a feature direction map of the second object searching device, and transmit the description string to the first object searching device. The first object searching device is further configured to generate a voice message according to the description string and the object name, and broadcast the voice message.

Therefore, according to the technical concept of the present invention, embodiments of the present disclosure provide object searching method, an object searching device, and an object searching system. In order to effectively help the user to find a specific item. In addition, the embodiments of the present disclosure combine the function of voice interaction to increase the user's convenience in use.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a schematic diagram illustrating a locator mapping table according to some embodiments of the present disclosure.

FIG. 4 is a schematic diagram illustrating an operational diagram according to some embodiments of the present disclosure.

FIG. 7 is a schematic diagram illustrating a feature direction map according to some embodiments of the present disclosure.

DETAILED DESCRIPTION

Figure 1:
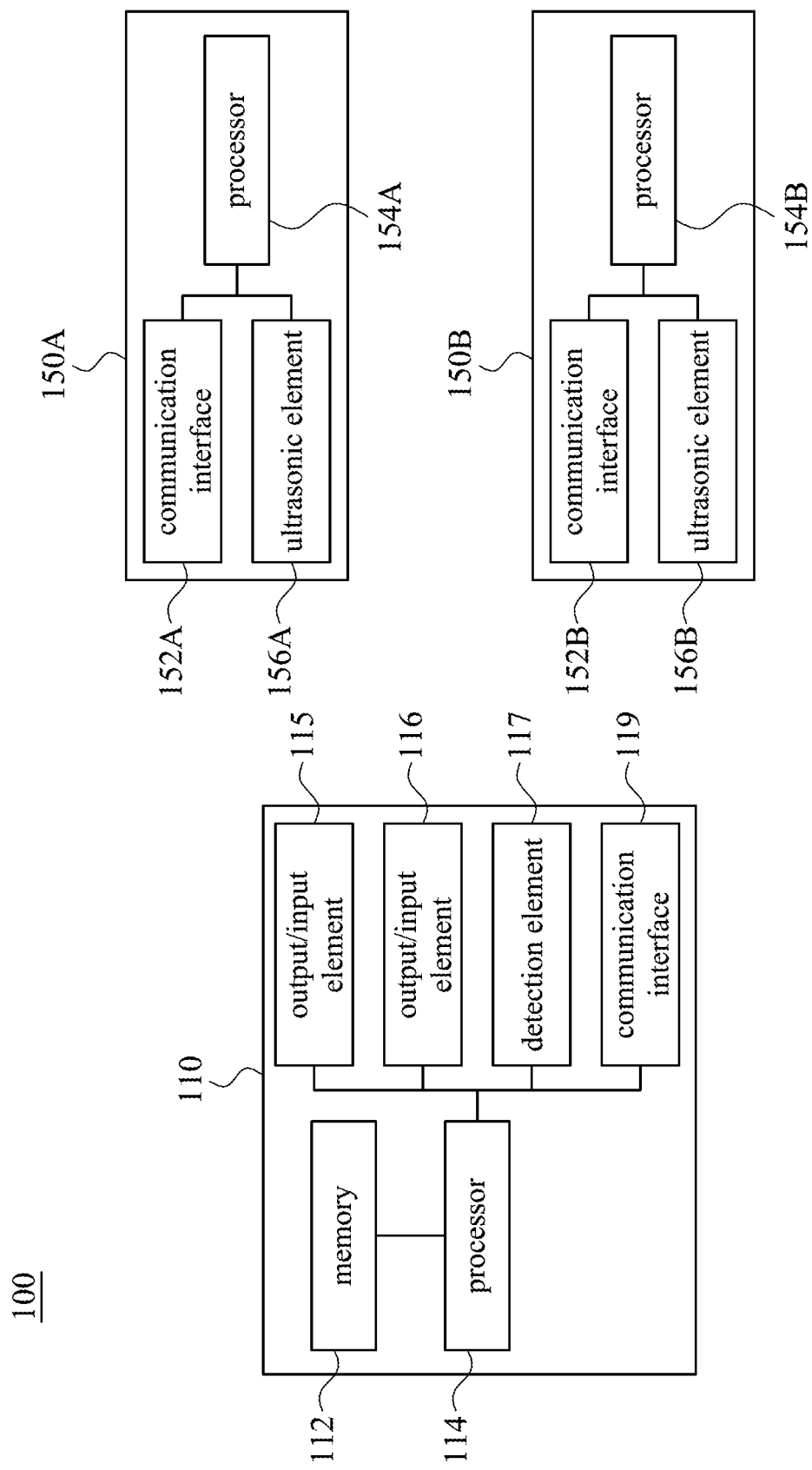
FIG. 1 is a schematic diagram illustrating an object searching system according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating an object searching system 100 according to some embodiments of the present disclosure. It should be noted that, the object searching system 100 as illustrated in FIG. 1 is for illustrative purposes only, and the present disclosure is not limited thereto. As illustrated in FIG. 1, the object searching system 100 includes an object searching device 110 and several locators 150A, 150B. The object searching device 110 includes a memory 112, a processor 114, an output/input element (the present disclosure takes several output/input elements 115 and 116 for example, but the present disclosure is not limited thereto), the detection element 117, and the communication interface 119. The locator 150A includes a communication interface 152A, a processor 154A, and an ultrasonic element 156A. The locator 150B includes a communication interface 152B, a processor 154B, and an ultrasonic element 156B.

In the connection relationship, the memory 112, the several output/input elements 115 and 116, the detection element 117, and the communication interface 119 are coupled to the processor 114 respectively. The communication interface 152A and the ultrasonic element 156A are coupled to the processor 154A respectively. The communication interface 152B and the ultrasonic element 156B are coupled to the processor 154B respectively.

The operational relationship between the object searching device 110 and the locators 150A, 150B will be described later with reference to FIG. 2.

Figure 2:
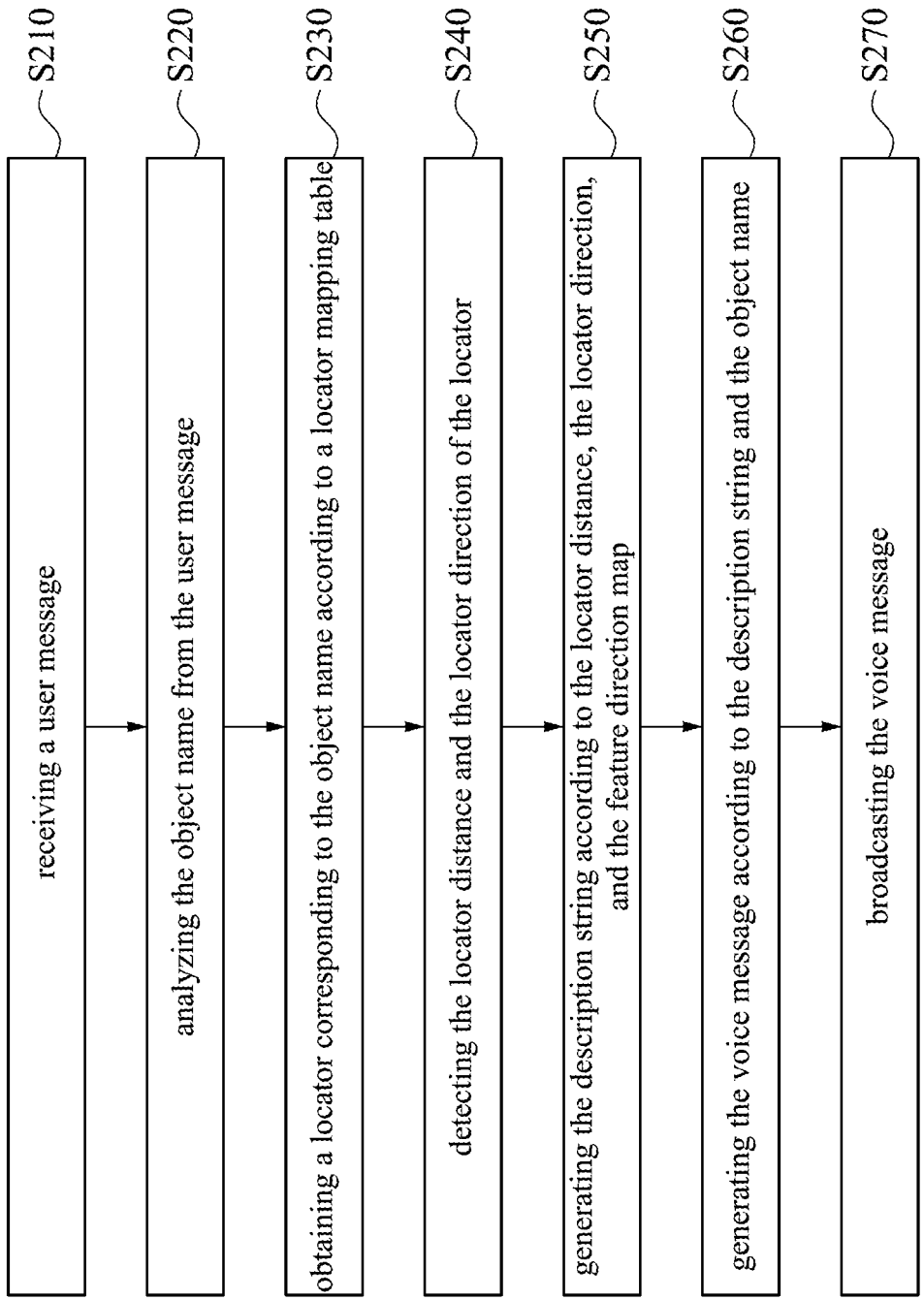
FIG. 2 is a flow chart illustrating an object searching method according to some embodiments of the present disclosure.

Reference is made to FIG. 2. FIG. 2 is a flow chart illustrating an object searching method 200 according to some embodiments of the present disclosure. The object searching method 200 includes operation S210 to S270.

In operation S210, receiving a user message. In some embodiments, the operation S210 may be operated by one of the output/input elements 115, 116 as illustrated in FIG. 1. For example, one of the output/input elements 115, 116 may be a microphone, which is configured to receive the voice message of the user.

In operation S220, analyzing the object name from the user message. In some embodiments, the operation S220 may be operated by the processor 114 in FIG. 1. The detailed operation of operation S220 will be explained later in FIG. 3.

Reference is made to FIG. 3 together. FIG. 3 is a schematic diagram illustrating a locator mapping table 300 according to some embodiments of the present disclosure. It should be noted that, the locator mapping table 300 as shown in FIG. 3 is only for illustrative only, and the present disclosure is not limited thereto.

In some embodiments, the locator mapping table 300 is stored in the memory 112 as illustrated in FIG. 1. As illustrated in FIG. 3, the preset object name corresponding to the locator number of 150A is the car key, and the preset object name corresponding to the locator number 150B is the hand phone.

In accordance with the above, when operating the operation S220, the processor 114 determines whether the user message includes the key word or not, and when the user message includes a key word, the processor 114 further determines whether the user message includes one of the several preset object names of the locator mapping table 300.

For example, if the user says "Aboa, where in the car key?" Assume the key word is "Aboa". When one of the output/input elements 115, 116 receives the key word of "Aboa", the object searching system 100 enters the inquiry status. Then, the processor 114 uses automatic speech recognition and natural language understanding to analyze semantics. For example, the processor 114 converts the voice message of "Aboa, may I ask where is the car key?" The voice message is converted to text message, after analysis it may be know that "may I ask" and "where" means inquiry location, and "car key" is the object that the user wants to find. At this time, the processor 114 compares the "car key" with the several preset object names of the locator mapping table 300, so as to determine whether the user message includes one of the preset object name. Since the "car key" exists in the locator mapping table 300, the processor 114 determines the object name of the object that the user wants to search is "car key".

Reference is made to FIG. 2 again. In operation S230, obtaining a locator corresponding to the object name according to a locator mapping table. In some embodiments, operation S230 may be operated by the processor 114 illustrated in FIG. 1. For example, reference is made to FIG. 3. If the object name is "car key", according to the locator mapping table 300 illustrated in FIG. 3, the processor 114 obtains that the locator corresponding to the object name is the locator with number 150A.

Figure 5:
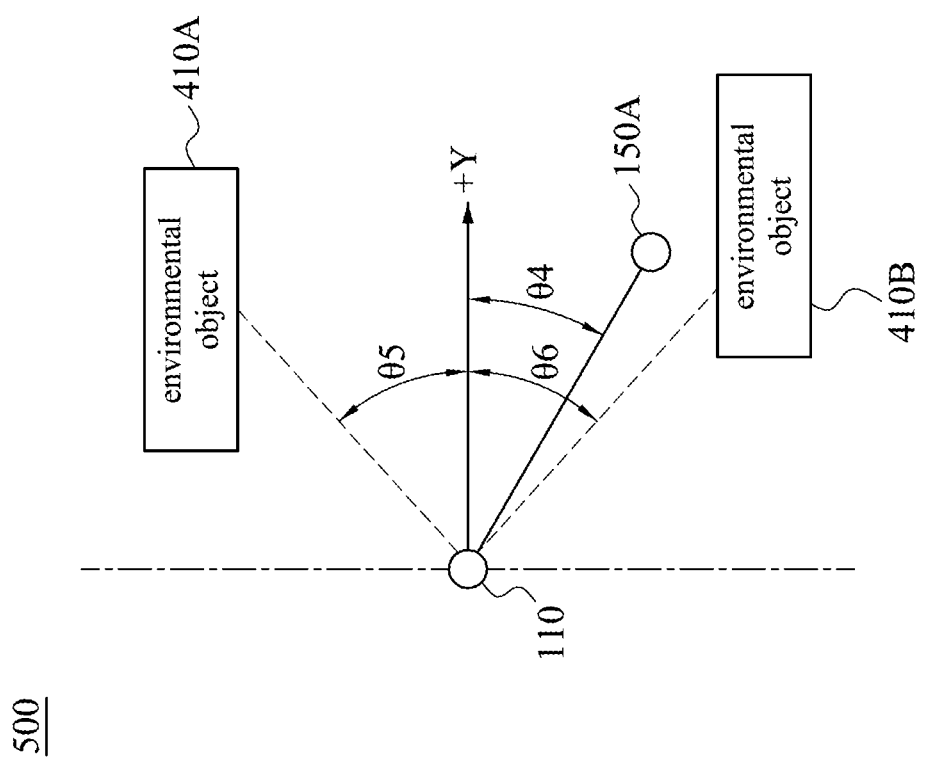
FIG. 5 is a schematic diagram illustrating an operational diagram according to some embodiments of the present disclosure.

In operation S240, detecting the locator distance and the locator direction of the locator. In some embodiments, operation S240 may be operated by the detection element 117 in FIG. 1. The detailed operation of the operation S240 will be described later in reference with FIG. 4 and FIG. 5. FIG. 4 is a schematic diagram illustrating an operational diagram 400 according to some embodiments of the present disclosure. FIG. 5 is a schematic diagram illustrating an operational diagram 500 according to some embodiments of the present disclosure. It should be noted that, the operational diagrams 400, 500 as illustrated in FIG. 4 and FIG. 5 are for illustrative purposes only, and the present disclosure is not limited thereto.

For example, assuming that the +X direction is the direction of 0 degree, in the situation of FIG. 4, the detection element 117 may detect that the locator direction of the locator 150A includes the horizontal angle of +30 degrees. Assuming that the +Y direction is a direction of 0 degree, in the situation of FIG. 5, the detection element 117 may detect that the locator direction of the locator 150A includes a pitch angle of −30 degrees.

Furthermore, the detection element 117 may also detect the locator distance between the locator 150A and the object searching device 110. For example, reference is made to FIG. 1 at the same time. The processors 154A, 154B as illustrated in FIG. 1 synchronize the time of the locators 150A, 150B and the object searching device 110.

In some embodiments, the processor 154A controls the ultrasonic element 156A to transmit ultrasonic to the object searching device 110. The detection element 117 receives the ultrasonic transmitted from the ultrasonic element 156A. Then, the processor 114, according to the ultrasonic received by the detection element 117, calculates the locator distance between the locator 150A and the object searching device 110 and calculates the locator direction of the locator 150A relative to the object searching device 110.

In some embodiments, the detection element 117 may be a microphone array. To be more detailed, the microphone array may be used to obtain the angle of incidence of the two ultrasonic waves, according to the distance between the two microphones, and the triangle theorem is configured to calculate the locator distance of the locator 150A. In addition, the microphone array may be used to obtain the incidence angle of three ultrasonic waves, the stereo incidence direction of the ultrasonic wave may be calculated according to the incidence angles, and the locator direction of the locator 150A may be further calculated.

Figure 6:
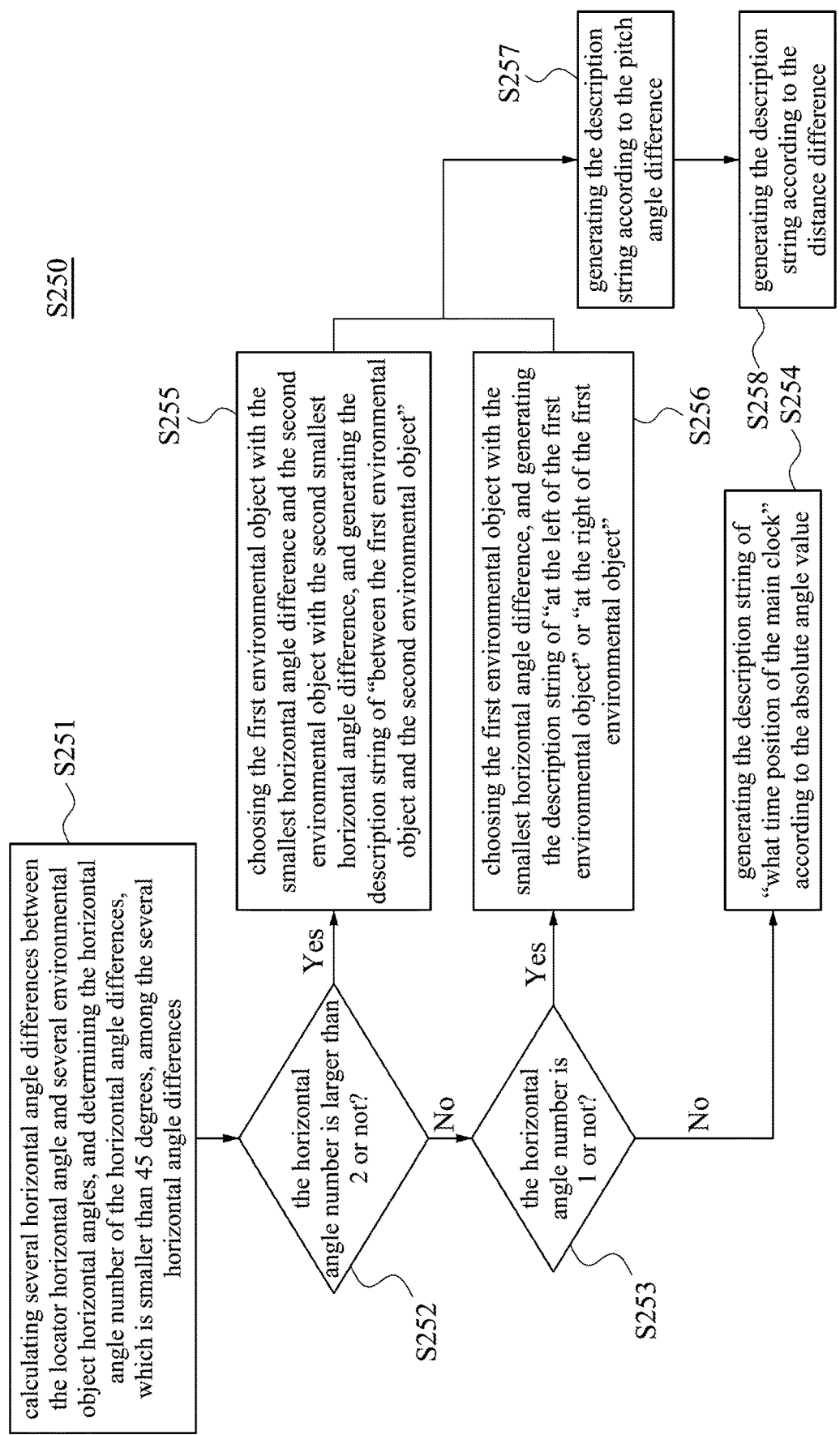
FIG. 6 is a flow chart illustrating one of the operations in FIG. 2 according to some embodiments of the present disclosure.

Reference is made to FIG. 2 again. In operation S250, generating the description string according to the locator distance, the locator direction, and the feature direction map. Reference is made to FIG. 6. FIG. 6 is a flow chart illustrating operation S250 in FIG. 2 according to some embodiments of the present disclosure. As illustrated in FIG. 6, operation S250 includes operations S251 to S258.

In operation S251, calculating several horizontal angle differences between the locator horizontal angle and several environmental object horizontal angles, and determining the horizontal angle number of the horizontal angle differences, which are smaller than 45 degrees, among the several horizontal angle differences. In some embodiments, the operation S251 may be operated by the processor 114 as illustrated in FIG. 1.

To explain operation S251, reference is made to FIG. 7 at the same time. FIG. 7 is a schematic diagram illustrating a feature direction map 700 according to some embodiments of the present disclosure. It should be noted that, as illustrated in the feature direction map 700 in FIG. 7 is for illustrative purposes only, and the present disclosure is not limited thereto.

As illustrated in FIG. 7, the feature direction map 700 includes the environmental object, the environmental object distance between the environmental object and the object searching device 110, the environmental object pitch angle between the environmental object and the object searching device 110, and the environmental object horizontal angle between the environmental object and the object searching device 110. For example, reference is made to FIG. 4, assuming that the horizontal angle $\theta 1$ between the locator 150A and the locator is +30 degrees, according to the feature direction map 700, since the environmental object horizontal angle $\theta 2$ of the door is +45 degrees, the processor 114 may calculate to obtain that the horizontal angle difference between the locator 150A and the door is 15 degrees. Furthermore, since the environmental object horizontal angle $\theta 3$ of the window is +95 degrees, the processor 114 may calculate to obtain the horizontal angle difference between the locator 150A and the window is 65 degrees. Then, according to the horizontal angle difference mentioning above, the processor 114 determines that the horizontal angle number of the horizontal angle differences, which are smaller than 45 degrees, among the horizontal angle differences, is 1.

In operation S252, determining whether the horizontal angle number is larger than 2 or not. In some embodiments, the operation S252 may be operated by the processor 114 illustrated in FIG. 1. If the horizontal angle number is larger or equal to 2, operation S255 is performed; on the other hand, if the horizontal angle number is not larger or equal to 2, operation S253 is performed.

In operation S253, determining whether the horizontal angle number is 1 or not. In some embodiments, operation S253 may be performed by the processor 114 as illustrated in FIG. 1. If the horizontal angle number is 1, operation S256 is performed. On the other hand, if the horizontal angle number is not 1, the horizontal angle number is 0, and operation S254 is operated.

In operation S254, generating the description string "what time position of the main clock" according to the absolute angle value. In some embodiments, the operation S254 may be performed by the processor 114 in FIG. 1. For example, if the locator horizontal angle $\theta 1$ of the locator 150A is 30 degrees, the processor 114 generates the description string of "at 1 o'clock position of the main clock".

In operation S255, choosing the first environmental object with the smallest horizontal angle difference and the second environmental object with the second smallest horizontal angle difference, and generating the description string of "between the first environmental object and the second environmental object". In some embodiments, operation S255 may be performed by the processor 114 as illustrated in FIG. 1. For example, if the locator horizontal angle of the locator 150A is +60 degrees, assuming both of the door and the window are environmental objects, since the horizontal angle difference between the door and the locator 150A and the horizontal angle difference between the window and the locator 150A are smaller than 45 degrees, the processor 114 chooses the door with the smallest horizontal angle difference as the first environmental object and the window with the second smallest horizontal angle difference as the second environmental object. Then, processor 114 generates the description string of "between the door and the window".

In operation S256, choosing the first environmental object with the smallest horizontal angle difference, and generating the description string of "at the left of the first environmental object" or "at the right of the first environmental object". In some embodiments, operation S256 may be performed by the processor 114 as illustrated in FIG. 1. For example, if the locator horizontal angle $\theta 1$ of the locator 150A is +30 degrees, since the horizontal angle difference between the door, which is the environmental object, and the locator 150A is the smallest, and the environmental object horizontal angle $\theta 2$ of the door is larger than the locator horizontal angle $\theta 1$ of the locator 150A, the processor 114 generates the description string of "at the left of the door". On the other hand, if the locator horizontal angle $\theta 1$ of the locator 150A is +48 degrees, since the horizontal angle difference between the door, which is the environmental object, and the locator 150A is the smallest, and the angle $\theta 2$ of the door, which is the environmental object horizontal, is smaller than the locator horizontal angle $\theta 1$ of the locator 150A, the processor 114 generates the description string of "at the right of the door".

In operation S257, generating the description string according to the pitch angle difference. In some embodiments, operation S257 may be operated by the processor 114 of FIG. 1. To be more detailed, when the horizontal angle number is equal to 1, the processor 114 calculates the first pitch angle difference between the locator pitch angle and the first pitch angle of the first environmental object, and the processor 114 further generates the description string according to the first pitch angle difference. When the horizontal angle number is larger than or equal to 2, the processor 114 calculates the first pitch angle difference and the second pitch angle difference between the locator pitch angle and the second pitch angle of the second environmental object, and the processor 114 further generates the description string according to the first pitch angle difference and the second pitch angle difference. For example, if the locator horizontal angle θ1 of the locator 150A is +30 degrees, the locator pitch angle θ4 is −30 degrees, according to the feature direction map 700 in FIG. 7, the processor 114 calculates that the pitch angle difference between the locator 150A and the door is −45 degrees, and the processor generates the description string of "under the door" according to the pitch angle difference. For another example, if the locator horizontal angle θ1 of the locator 150A is +30 degrees, the locator pitch angle θ4 is +20 degrees, according to the feature direction map 700 of FIG. 7, the processor 114 calculates that pitch angle difference between the locator 150A and the door is +5 degrees, and the processor 114 generates the description string of "above the door" according to the pitch angle difference.

In operation S258, generating the description string according to the distance difference. In some embodiments, operation S258 may be performed by the processor 114 in FIG. 1. To be more detailed, when the horizontal angle number is equal to 1, the processor 114 calculates the first distance difference between the locator distance and the first environmental object distance of the first environmental object, and the processor 114 generates a description string according to the first distance difference. When the horizontal angle number is larger than or equal to 2, the processor 114 calculates the first distance difference and a second distance difference between the second environmental object distance of the second environmental object and the locator distance, and the processor 114 generates a description string according to the first distance difference and the second distance difference. For example, if the locator horizontal angle θ1 of the locator 150A is +30 degrees, the locator pitch angle θ4 is −30 degrees, and the distance is 5 meters. According to the feature direction map 700 in FIG. 7, the processor 114 calculates that the distance difference between the locator 150A and the door is −10 meters, and generating the description string of "in front of the door" according to the distance difference. For another example, if the locator horizontal angle θ1 of the locator 150A is +30 degrees, the locator pitch angle θ4 is −30 degrees, and the distance is 20 meters. According to the feature direction map 700 in FIG. 7, the processor 114 calculates that the distance difference between the locator 150A and the door is +5 meters, and the processor 114 generates the description string of "behind the door" according to the distance difference.

Reference is made to FIG. 2 again. In operation S260, generating the voice message according to the description string and the object name. In some embodiments, operation S260 may be operated by the processor 114 in FIG. 1. To be more detailed, the processor 114 combines the description string and the object name to generate the reply string, and the processor 114 converts the reply string into the voice message. For example, the processor 114 combines "car key" and "at 1 o'clock direction of the main system" to generate the reply string "the car key is at 1 o'clock direction of the main system", or the processor 114 combines "hand phone" and "at the left, under, and in front of the door" to generate the reply string of "the hand phone is at the left, under, and in front of the door". The processor 114 converts the above mentioning reply string into a voice message.

In operation S270, broadcasting the voice message. In some embodiments, the operation S270 may be operated by the output/input element 115 or the output/input element 116 as illustrated in FIG. 1. When the user hears the voice message, the user may know the position of the object to be searched.

In some embodiments, the object searching method 200 further includes obtaining several locator numbers and several preset object names corresponding to several locator numbers, and establishing the locator mapping table 300 according to the locator numbers and the several preset object names as illustrated in FIG. 3.

For example, the user inputs the locator number and the corresponding preset object name through the output/input element 115 or the output/input element 116 as illustrated in FIG. 1 by typing or by voice. Then, the output/input element 115 or the output/input element 116 transmit the locator number and the corresponding preset object name to the processor 114 as illustrated in FIG. 1. According to the locator number and the corresponding preset object name, the processor 114 establishes the locator mapping table 300 and transmits the locator mapping table 300 to the memory 112 as illustrated in FIG. 1 so as to store in the locator mapping table 300.

In some other embodiments, the detection element 117 as shown in FIG. 1 may be a surrounding camera. The surrounding camera may identify the object name bounded with the locators 150A, 150B by image recognition. For example, when the locator 150A is bound to the car key and the locator 150B is bound to the hand phone, the surrounding camera identifies that the locator 150A is bound to the car key by image recognition and the locator 150B is bound to the hand phone. The surrounding camera transmits the information mentioning above to the processor 114 as illustrated in FIG. 1. According to the information mentioning above, the processor 114 establishes the locator mapping table 300 and transmits the locator mapping table 300 to the memory 112 as illustrated in FIG. 1 so as to store in the locator mapping table 300.

In some embodiments, the object searching method 200 further includes obtaining several environmental object distances in a space and several environmental object directions, and establishing the feature direction map 700 as illustrated in FIG. 7 according to several environmental object distances and several environmental object directions.

For example, reference is made to FIG. 4 and FIG. 5. Assuming that the environmental object 410A is a door, and that the environmental object 410B is a window. The user may locate the locator 150A near the door and locate the locator 150B near the window. The user further inputs the locator number and the corresponding environmental object by typing or vocal through the output/input element 115 or 116 as illustrated in FIG. 1. For example, the user may set the environmental object corresponding to the locator 150A to be the door by typing, set the environmental object corresponding to the locator 150B to be the window by typing, and transmit the above information to the object searching device 110 in FIG. 1. Then, the detection element 117 detects the environmental object direction and the environmental object distance of the locator 150A relative to the object searching device 110 (that is, the environmental object distance and the environmental object direction of the door relative to the object searching device 110), and the detection element 117 detects the environmental object distance and the environmental object direction of the locator 150B relative to the object searching device 110 (that is, the environmental object distance and the environmental object direction of the window relative to the object searching device 110). The environmental object direction mentioning above includes the environmental object pitch angle and the environmental object horizontal angle.

For example, in the situation of FIG. 4, the detection element 117 detects that the environmental object horizontal angle θ2 of the environmental object 410A is +45 degrees, and the environmental object horizontal angle θ3 of the environmental object 410B is +95 degrees. In the situation of FIG. 5, the detection element 117 detects that the environmental object pitch angle θ5 of the environmental object 410A is +15 degrees and the environmental object pitch angle θ6 of the environmental object 410B is −45 degrees.

After the detection element 117 detects the environmental object distance and the environmental object direction, the detection element 117 transmits the environmental object distance and the environmental object direction to the processor 114 in FIG. 1, the processor 114 further establishes the feature direction map 700 according to the environmental object distance and the environmental object direction.

In some other embodiments, the detection element 117 as illustrated in FIG. 1 may be surrounding camera. The surrounding camera may identify several environmental objects in a space, the environmental object distance, and the environmental object direction of each of the environmental object by image recognition. For example, the surrounding camera may identify the environmental objects, such as doors and windows by the photos taken, and the surrounding camera may identify, by the photos taken, the environmental object distance and the environmental object direction of the door, which is an environmental object, relative to the object searching device 110, and the environmental object distance and the environmental object direction of the window, which is an environmental object, relative to the object searching device 110. The surrounding camera transmits the above information to the processor 114 as shown in FIG. 1. According to the information mentioning above, the processor 114 establishes the feature direction map 700 and transmits the feature direction map 700 to the memory 112 as illustrated in FIG. 1 so as to store the feature direction map 700.

Figure 8:
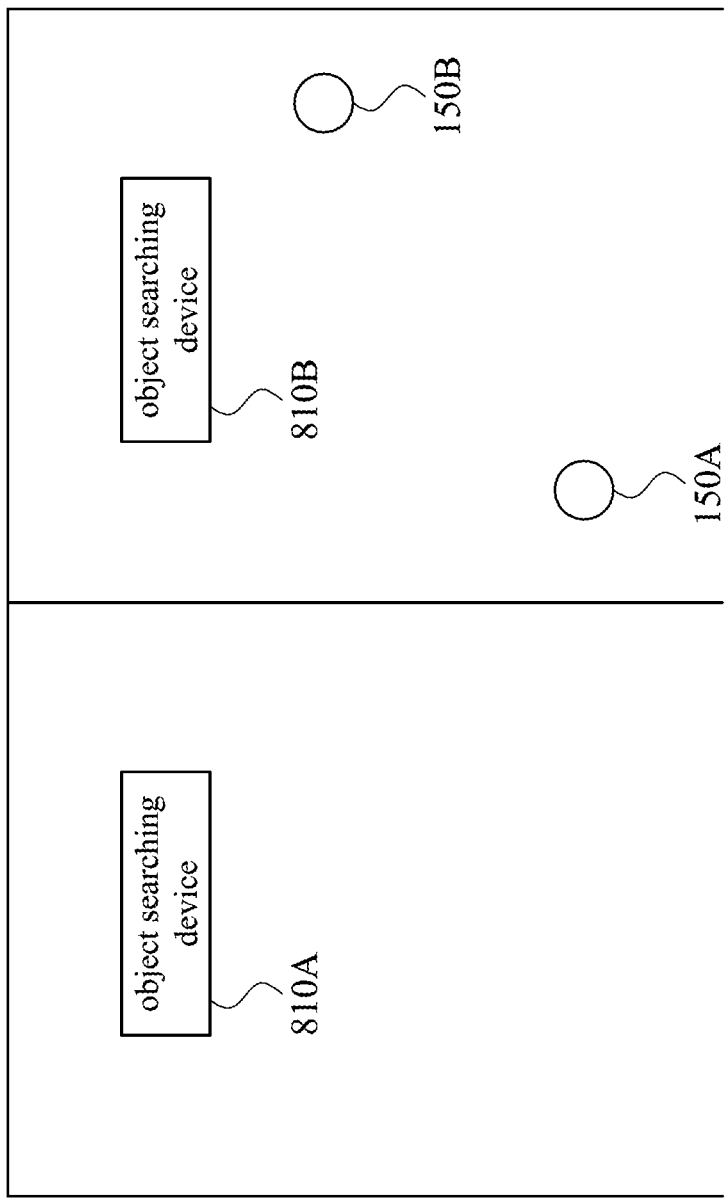
FIG. 8 is a schematic diagram illustrating an object searching system according to some embodiments of the present disclosure.

Reference is made to FIG. 8. FIG. 8 is a schematic diagram illustrating an object searching system 800 according to some embodiments of the present disclosure. As illustrated in FIG. 8, the object searching system 800 includes several object searching devices 810A, 810B. The object searching device 810A is located at first space, the object searching device 810B is located at second space, and the object searching device 810A is communicatively connected to the object searching device 810B. The detail structure of the object searching device 810A, 810B may be the object searching device 110 as illustrated in FIG. 1. The object searching system 800 as illustrated in FIG. 8 is for illustrative purposes only, and the present disclosure is not limited thereto. For example, the object searching system 800 may include several object searching devices located at different spaces.

In some embodiments, the object searching devices 810A, 810B store the same locator mapping table 300. The feature direction map 700 stored in the object searching device 810A includes several environmental object in the first space, and the feature direction map 700 stored in the object searching device 810B includes several environmental objects stored in the second space.

To be more detailed, the object searching device 810B obtains several environmental object distances and several environmental object directions of the several environmental objects in the second space, and the object searching device 810B establishes the feature direction map 700 of the object searching device 810B according to several environmental object distances and several environmental object directions. The object searching device 810A obtains several environmental object distances and several environmental object directions of several environmental objects in a first space, and the object searching device 810A establishes the feature direction map 700 of the object searching device 810A according to several environmental object distances and several environmental object directions.

In the operational relationship, the object searching device 810A receives the user message, analyzes the object name from the user message, obtains the locator corresponding to the object name according to the locator mapping table 300 stored in the object searching device 810A, and detects the locator. When the object searching device 810A is unable to detect the locator, the object searching device 810A transmits the searching instruction to the object searching device 810B. The object searching device 810B detects the locator according to the searching instruction. If the object searching device 810B detected the locator, the object searching device 810B detects the locator distance and locator direction of the locator, generates the description string according to the locator distance, the locator direction, and the feature direction map 700 of the object searching device 810B, and transmits the description string to the object searching device 810A. After the object searching device 810A receives the description string transmitted by the object searching device 810B, the object searching device 810A generates the voice message according to the description string and broadcasts the voice message.

For example, assuming both of the locator 150A and the locator 150B are located within the second space. The user transmits the user message to the object searching device 810A at the first space. The object searching device 810A analyzes to obtain that the object name is the car key according to the user message, and the object searching device 810A obtains that the locator corresponding to the object name is locator 150A according to the locator mapping table 300 stored in the object searching device 810A. Since the locator 150A and the object searching device 810A are not situated in the same space, the object searching device 810A is unable to detect the locator 150A. Therefore, the object searching device 810A transmits the searching instruction to the object searching device 810B. In some embodiments, the searching instruction includes the information that the locator to be found is the locator 150A.

After the object searching device 810B receives the searching instruction, the object searching device 810B detects the locator 150A. Since the locator 150A and the object searching device 810B are located in the same space, the object searching device 810B may detect the locator 150A. The object searching device 810B detects locator distance and the locator direction of the locator 150A, and the object searching device 810B generates the description string according to the locator distance, the locator direction, and the feature direction map 700 of the object searching device 810B. Then, the object searching device 810B transmits the description string to the object searching device 810A. After the object searching device 810A receives the description string transmitted by the object searching device 810B, the object searching device 810A generates the voice message according to the description string, and broadcasts the voice message. In some embodiments, the voice message includes the information of the second space that the locator 150A is located in.

In some embodiments, the processor 114, 154A, 154B may be a server, a circuit, a central processor unit (CPU), a microprocessor (MCU) or other devices with functions of storage, calculation, data reading, signals or messages receiving, signals or messages transmitting, or other equivalent function. In some embodiments, the memory 112 may be a read only memory, a flash memory, a floppy disk, a hard drive, a CD, a flash drive, a tape or other equivalent device or circuit.

In some embodiments, the output/input elements 115, 116 may be devices or circuits having the functions of receiving signals or messages, transmitting signals or messages, or other equivalent functions. For example, the output/input elements 115, 116 may be keyboards, mouse, microphones, speakers, etc. In some embodiments, the communication interfaces 119, 152A, 152B may be devices or circuits having the functions of receiving and transmitting time synchronization signals, or other equivalent functions.

In some embodiments, the detection element 117 may be a device or a circuit with the functions of object position detection or other equivalent functions. The object position includes the object distance or the object direction. In some embodiments, the ultrasonic elements 156A, 156B may be a device or circuit with the functions of ultrasonic transmission and/or ultrasonic reception or other equivalent functions.

Based on the aforementioned embodiments, embodiments of the present disclosure provide an object searching method, an object searching device, and an object searching system, so as to effectively help users find specific items. In addition, the embodiments of the present disclosure combine the function of voice interaction to increase the user's convenience in use.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An object searching method, comprising:
   receiving, by an object searching device, an user message;
   analyzing, by the object searching device, an object name from the user message;
   obtaining, by the object searching device, a locator corresponding to the object name according to a locator mapping table;
   detecting, by the object searching device, a locator distance and a locator direction of the locator;
   generating, by the object searching device, a description string according to the locator distance, the locator direction, and a feature direction map;
   generating, by the object searching device, a voice message according to the description string and the object name; and
   broadcasting, by the object searching device, the voice message;
   wherein the feature direction map comprises an environmental object distance and an environmental object direction of at least one environmental object in a space.

2. The object searching method of claim 1, further comprising:
   obtaining, by the object searching device, an environmental object distance and an environmental object direction of at least one environmental object in a space; and
   establishing the feature direction map, by the object searching device, according to the environmental object distance and the environmental object direction.

3. The object searching method of claim 2, wherein the at least one environmental object comprises a plurality of environmental objects, the environmental object direction of each of the plurality of environmental objects comprises an environmental object horizontal angle; the locator direction comprises a locator horizontal angle; wherein generating, by the object searching device, the description string according to the locator distance, the locator direction, and the feature direction map comprises:
   calculating a plurality of horizontal angle differences between the locator horizontal angle and the plurality of environmental object horizontal angles;
   determining a horizontal angle number of the horizontal angle differences, which are smaller than 45 degrees, among the plurality of horizontal angle differences; and
   generating the description string in correspondence according to the horizontal angle number.

4. The object searching method of claim 3, wherein generating, by the object searching device, the description string according to the locator distance, the locator direction, and the feature direction map further comprises:
   determining a first horizontal angle difference, which is the smallest, among the plurality of horizontal angle differences when the horizontal angle number is equal to 1, in order to determine a first environmental object corresponding to the first horizontal angle difference;
   determining the first horizontal angle difference and a second horizontal angle difference among the plurality of horizontal angle differences when the horizontal angle number is larger than or equal to 2, wherein the second horizontal angle difference is the second smallest one, in order to determine the first environmental object and a second environmental object corresponding to the second horizontal angle difference.

5. The object searching method of claim 4, wherein the locator direction comprises a locator pitch angle, wherein obtaining, by the object searching device, the description string according to the locator distance, the locator direction, and the feature direction map further comprises:
calculating a first pitch angle difference between the locator pitch angle and a first pitch angle of the first environmental object when the horizontal angle number is equal to 1, in order to generate the description string according to the first pitch angle difference; and
calculating the first pitch angle difference and a second pitch angle difference between the locator pitch angle and a second pitch angle of the second environmental object; when the horizontal angle number is larger than or equal to 2, in order to generate the description string according to the first pitch angle difference and the second pitch angle difference.

6. The object searching method of claim 4, wherein generating, by the object searching device, the description string according to the locator distance, the locator direction, and the feature direction map further comprises:
calculating a first distance difference between the locator distance and a first environmental object distance of the first environmental object when the horizontal angle number is equal to 1, in order to generate the description string according to the first distance difference; and
calculating the first distance difference and a second distance difference between the locator distance and a second environmental object distance of the second environmental object, in order to generate the generate the description string according to the first distance difference and the second distance difference.

7. The object searching method of claim 1, wherein the locator mapping table comprises at least one preset object name and at least one locator number corresponding to the at least one preset object name, wherein analyzing, by the object searching device, the object name from the user message comprises:
determining whether the user message comprises a key word; and
determining whether the user message comprises at least one preset object name when the use message comprises the key word.

8. The object searching method of claim 1, wherein generating, by the object searching device, the voice message according to the description string and the object name comprises:
combining the description string and the object name to generate a reply string; and
converting the reply string to the voice message.

9. The object searching method of claim 1, further comprising:
obtaining, by the object searching device, a plurality of locator numbers and a plurality of preset object names corresponding to the plurality of locator numbers; and
establishing, by the object searching device, the locator mapping table according to the plurality of locator numbers and the plurality of preset object names.

10. An object searching device, comprising:
an output/input element, configured to receive a user message;
a memory, configured to store a locator mapping table and a feature direction map; and
a processor, configured to analyze an object name from the user message, and to obtain a locator corresponding to the object name according to the locator mapping table; and
a detection element, configured to detect a locator distance and a locator direction of the locator;
wherein the processor is further configured to generate a description string according to the locator distance, the locator direction, and the feature direction map, and generate a voice message according to the description string and the object name, wherein the output/input element broadcasts the voice message:
wherein the feature direction map comprises an environmental object distance and an environmental object direction of at least one environmental object in a space.

11. The object searching device of claim 10, wherein the detection element is further configured to obtain an environmental object distance and the environmental object direction of the at least one environmental object in the space; the processor is further configured to establish the feature direction map according to the environmental object distance and the environmental object direction.

12. The object searching device of claim 11, wherein the at least one environmental object comprises a plurality of environmental objects, the environmental object direction of each of the environmental object comprises an environmental object horizontal angle; the locator direction comprises a locator horizontal angle; the processor is further configured to calculate a plurality of horizontal angle differences between the locator horizontal angle and the plurality of environmental object horizontal angles, determine a horizontal angle number of the plurality of horizontal angle differences, which are smaller than 45 degrees, and generate the description string in correspondence according to the horizontal angle number.

13. The object searching device of claim 12, wherein when the horizontal angle number is equal to 1, the processor is further configured to determine a first horizontal angle difference among the plurality of horizontal angle differences, which is the smallest, in order to determine a first environmental object corresponding to the first horizontal angle difference; when the horizontal angle number is larger or equal to 2, the processor is further configured to determine the first horizontal angle difference among the plurality of horizontal angle differences and a second horizontal angle difference among the plurality of horizontal angle differences, which is the second smallest one, in order to determine the first environmental object and a second environmental object corresponding to the second horizontal angle difference.

14. The object searching device of claim 13, wherein the locator direction comprises a locator pitch angle, wherein when the horizontal angle number is equal to 1, the processor is further configured to calculate a first pitch angle difference between the locator pitch angle and a first pitch angle of the first environmental object, in order to generate the description string according to the first pitch angle difference; when the horizontal angle number is larger or equal to 2, the processor is further configured to calculate the first pitch angle difference and a second pitch angle difference between the locator pitch angle and a second pitch angle of the second environmental object, in order to generate the description string according to the first pitch angle difference and the second pitch angle difference.

15. The object searching device of claim 13, wherein when the horizontal angle number is equal to 1, the processor is further configured to calculate a first distance difference between the locator distance and a first environmental object distance of the first environmental object, in order to generate the description string according to the first distance difference; when the horizontal angle number is larger or equal to 2, the processor is further configured to calculate the first distance difference and a second distance difference between the locator distance and a second environmental object distance of the second environmental object, so as to generate the description string according to the first distance difference and the second distance difference.

16. The object searching device of claim 10, wherein the locator mapping table comprises at least one preset object name and at least one locator number corresponding to the at least one preset object name, wherein the processor is further configured to determine whether the user message comprises a key word or not, and determine whether the user message comprises the at least one preset object name when the user message comprises the key word.

17. The object searching device of claim 10, wherein the processor is further configured to combine the description string and the object name to generate a reply string, and convert the reply string to the voice message.

18. The object searching device of claim 10, wherein the processor is further configured to obtain a plurality of locator numbers and a plurality of preset object names corresponding to the plurality of locator numbers through the detection element, the output/input element, or any combination thereof, wherein the processor is further configured to establish the locator mapping table according to the plurality of locator numbers and the plurality of preset object names.

19. An object searching system, comprising:
   a first object searching device, located at a first space, configured to receive a user message, analyze an object name from the user message, obtain a locator corresponding to the object name according to a locator mapping table, and detect the locator, when the first object searching device is unable to detect the locator, the first object searching device transmits a searching instruction; and
   a second object searching device, located at a second space, communicatively connected to the first object searching device, configured to detect a locator distance and a locator direction of the locator according to the searching instruction, generate a description string according to the locator distance, the locator direction, and a feature direction map of the second object searching device, and transmit the description string to the first object searching device;
   wherein the first object searching device is further configured to generate a voice message according to the description string and the object name, and broadcast the voice message;
   wherein the feature direction map comprises an environmental object distance and an environmental object of at least one environmental object in a space.

20. The object searching system of claim 19, wherein the second object searching device is further configured to obtain the environmental object distance and the environmental object direction of the least one environmental object in the second space, and establish the feature direction map according to the environmental object distance and the environmental object direction.

* * * * *